(12) United States Patent
Bishop

(10) Patent No.: US 6,266,748 B1
(45) Date of Patent: Jul. 24, 2001

(54) PRIORITY ENCODING FOR FIFO MEMORY DEVICES THAT INTERFACE MULTIPLE PORTS TO A DATA RECEIVING DEVICE

(75) Inventor: Robert H. Bishop, Lawrenceville, GA (US)

(73) Assignee: Integrated Device Technology, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,667

(22) Filed: Mar. 30, 1999

(51) Int. Cl.[7] .................................................... G06F 12/00
(52) U.S. Cl. ............................................................ 711/158
(58) Field of Search ............................................. 711/158

(56) References Cited

U.S. PATENT DOCUMENTS 6,122,717 * 9/2000 Chan et al. ........................... 711/170

* cited by examiner

Primary Examiner—Jack A. Lane
(74) Attorney, Agent, or Firm—Myers Bigel Sibley & Sajovec

(57) ABSTRACT

A priority encoding interface transmits data to the receiving device from a highest priority FIFO memory block that is selected from at least two of a plurality of FIFO memory blocks until the highest priority FIFO memory block is empty. The interface inhibits transfer of data to the data receiving device from remaining ones of the FIFO memory blocks, until the highest priority FIFO memory block is empty. Transmission of data from the highest priority FIFO memory block and inhibited transfer of data from remaining ones of the FIFO memory blocks, take place in response to an indication from the data receiving device that the data receiving device is enabled to receive data from the at least two of the FIFO memory blocks.

20 Claims, 3 Drawing Sheets

PRIORITY ENCODING FOR FIFO MEMORY DEVICES THAT INTERFACE MULTIPLE PORTS TO A DATA RECEIVING DEVICE

FIELD OF THE INVENTION

This invention relates to First-In-First-Out (FIFO) memory devices, and more particularly to FIFO memory devices that interface multiple ports to a data receiving device.

BACKGROUND IF THE INVENTION

First-In-First-Out (FIFO) memory devices are widely used to store data. FIFO memory devices generally include one or more FIFO memory blocks. In a FIFO memory block, data generally is stored in a sequential order as data is written into the memory block. The FIFO memory block typically is sequentially read in the same order as it was written. Thus, the data that is first written into the FIFO device is also the data that is first read from the FIFO device.

FIFO memory devices are widely used to buffer data in network applications. In network applications, data packets may be stored in the FIFO memory device in the sequential order that they are written. For routing or distribution, the data is sequentially read starting from the first data that was written.

A plurality of FIFO memory blocks may be used in a FIFO memory device that interfaces a plurality of ports to a data receiving device. For example, an integrated circuit 4-Port Multliplexer-FIFO is marketed by Integrated Device Technology, Inc., the assignee of the present application, as Device IDT77305. See the Data Sheet entitled "UtopiaFIFO™ 4-Port (128×9×4) Multiplexer-FIFO", IDT77305, January 1996. The IDT77305 is a high-speed, low power 4:1 multiplexed FIFO with multiple programmable modes of operation. Within the IDT77305, the input FIFOs act as intermediate queues for the input streams, to allow synchronization with a common output stream. A round robin sequencer sequentially selects one of four FIFOs to output data.

As described above, FIFO memory devices may be used to interface a plurality of ports to a data receiving device. One important application of FIFO memory devices is under a specification known as the Universal Test and Operation Physical (PHY) Interface for Asynchronous Transfer Mode (ATM) specification or the UTOPIA specification. The UTOPIA specification defines an interface between a plurality of ports and an ATM device. In this application, the FIFO memory device synchronizes input and output of data between relatively slow physical devices and a relatively high speed ATM device.

UTOPIA is a Physical Layer to ATM Layer interface that was standardized by the ATM Forum. It has separate transmit and receive channels and specific handshaking protocols. UTOPIA Level 2 includes dedicated address signals for both the transmit and receive directions that allow the ATM Layer device to specify which of the four physical (PHY) channels it is communicating with. In contrast, UTOPIA Level 1 does not use address signals. Instead, key handshaking signals are duplicated so that each channel has its own signals.

In UTOPIA Level 1 operation, it may be desirable to efficiently select which of the four channels, also referred to as ports, communicates with the ATM device. Since UTOPIA Level 1 does not use addressing, the ATM device can enable communications from multiple ports. Since it is possible for more than one port to contain data, it may be desirable to allow only one of the enabled ports to be selected at any time. The selection should preferably allow efficient communications between the relatively low speed ports and the relatively high speed data receiving device.

As described above, it is known to provide a round robin sequencer in order to allow multiple ports to sequentially communicate with the data receiving device. See also, U.S. patent application Ser. No. 08/664,873, filed Jun. 17, 1996 to Chan et al., entitled "First-In-First-Out Memory Device With Programmable Cell Sizes and Multiplexing Functions", assigned to the assignee of the present application, the disclosure of which is hereby incorporated herein by reference. Notwithstanding the use of round robin sequencers to allow multiple ports to communicate data to a data receiving device, there continues to be a need to efficiently interface a plurality of ports to a data receiving device.

SUMMARY OF THE INVENTION

It is therefore an object of the present invention to provide improved interfacing from a plurality of ports to a data receiving device.

It is another object of the present invention to provide interfacing from a plurality of ports to a data receiving device that can allow relatively low speed ports to efficiently communicate data to a relatively high speed data receiving device.

These and other objects are provided, according to the present invention, by a priority encoding interface that transmits data to the receiving device from a highest priority FIFO memory block that is selected from at least two of a plurality of FIFO memory blocks until the highest priority FIFO memory block is empty. The interface inhibits transfer of data to the data receiving device from remaining ones of the FIFO memory blocks, even though they contain data, until the highest priority FIFO memory block is empty. Transmission of data from the highest priority FIFO memory block and inhibited transfer of data from remaining ones of the FIFO memory blocks, take place in response to an indication from the data receiving device that the data receiving device is enabled to receive data from the at least two of the FIFO memory blocks.

Accordingly, a plurality of FIFO memory blocks are provided, a respective one of which receives data from a respective one of a plurality of ports. The data receiving device can enable any or all of the ports to receive data therefrom. However, notwithstanding enablement of more than one port by the data receiving device, the present invention allows data transmission to the data receiving device from the highest priority port that is selected from the enabled ports until the FIFO from the highest priority port is empty, even though the other enabled ports contain data.

Once enabled and transfer begins, the highest priority FIFO memory block will continue to transmit data to the data receiving device, until the associated FIFO memory block is empty. Transfers from other memory blocks are disabled, notwithstanding that the other ports are also enabled and may include data in their FIFO memory blocks. Data transmission from the remaining FIFO ports also may be disabled, notwithstanding the data receiving device ceases to enable the highest priority port, until the enabled FIFO memory block is empty.

Accordingly, transfers from the relatively slow speed ports may be conducted efficiently by allowing the FIFO to be emptied rather than stopped in midstream. Once emptied, the next highest priority port can then transmit its full FIFO contents to the data receiving device. Efficient interfacing between a plurality of ports and a data receiving device may thereby be provided.

The present invention is preferably implemented as an integrated circuit that interfaces a plurality of ports, such as serial ports for a plurality of physical devices that are connected by twisted copper pairs or other transmission media to an ATM device, such as an ATM switch. The interface is preferably provided by logic devices on an integrated circuit chip. However, the interface may also be provided by a processor on the integrated circuit chip that executes programmed instructions.

In a preferred embodiment of the present invention, each of the FIFO memory blocks provides an indication that the FIFO block is empty. A priority encoder identifies the highest priority FIFO memory block from the at least two of the FIFO memory blocks that are enabled to receive data by the data receiving device, in response to an indication from the data receiving device that the data receiving device is enabled to receive data from at least two of the FIFO memory blocks. A logic circuit produces a FIFO selection signal for the identified highest priority FIFO memory block, in response to the priority encoder and to the indications that the FIFO blocks are empty. The FIFO selection signal remains active, until the identified highest priority FIFO block is empty. The multiplexer transmits data to the data receiving device from the identified highest priority memory block in response to the FIFO selection signal.

Preferably, each of the FIFO memory blocks is assigned a predetermined priority number, from a lowest priority number to a highest priority number. The priority encoder selects the FIFO memory block having the highest priority number from the at least two of the FIFO memory blocks that are enabled by the data receiving device. Other techniques of assigning priority numbers may also be used.

Each of the FIFO memory blocks may comprise a plurality of cells. For example, for ATM communications, the UTOPIA specification specifies a cell size of the 53 bytes per cell. Each FIFO may then include a plurality of cells such as three cells. Priority encoding according to the invention preferably is responsive to the indication from the data receiving device that the data receiving device is enabled to receive data from at least two of the FIFO memory blocks, to transmit data to the data receiving device from all of the cells in the highest priority FIFO memory block, until all of the cells in the highest priority FIFO memory block are empty. The priority encoding also preferably inhibits transfer of data to the data receiving device from remaining ones of the FIFO memory blocks, until all of the cells in the highest priority FIFO memory block are empty.

Although the present invention will be described in connection with data transfer under the UTOPIA Level 1 specification using serial ports and an ATM device, it also is applicable to other FIFO memory devices that interface a plurality of ports to a data receiving device. Moreover, as described above, the present invention may be provided as systems, methods and/or computer program products.

DETAILED DESCRIPTION OF THE PREFFERED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
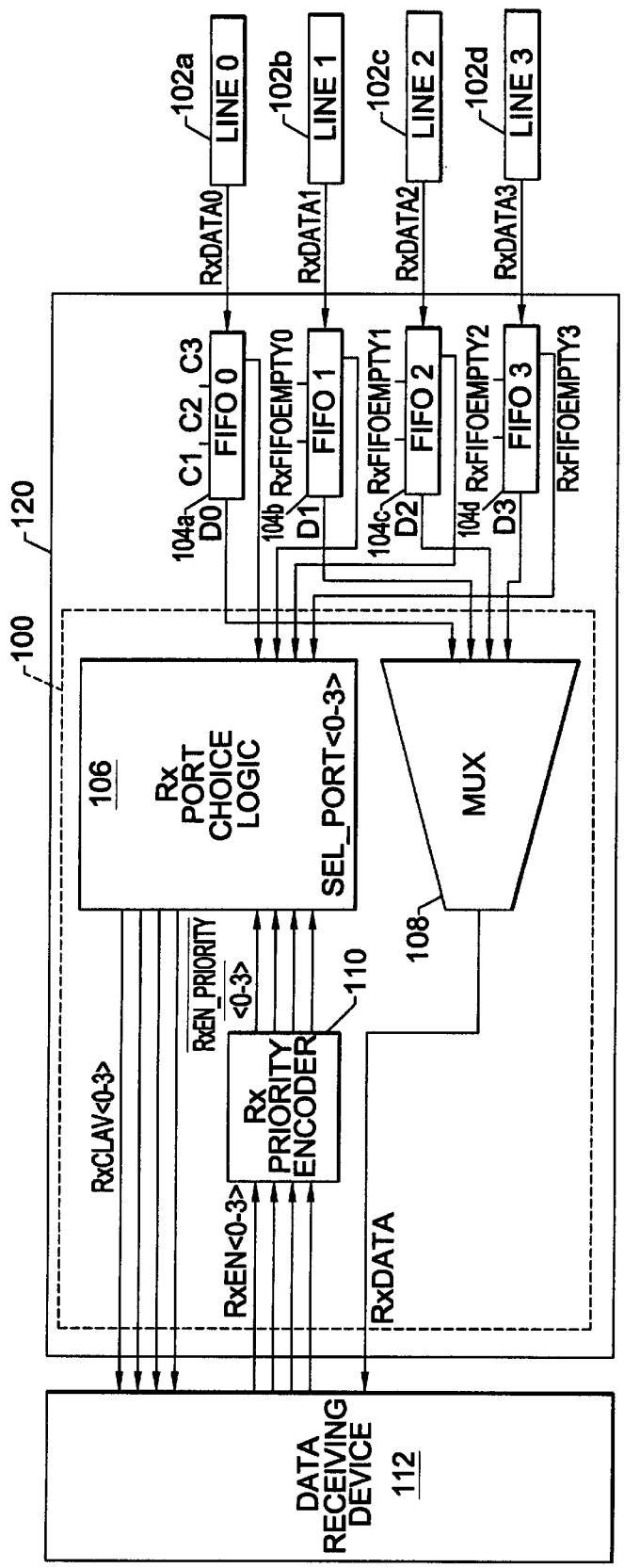
FIG. 1 is a block diagram of FIFO memory devices that interface a plurality of ports to a data receiving device according to the present invention.

Referring now to FIG. 1, a FIFO memory device 120 that interfaces a plurality of ports 102a–102d to a receiving data device 112, such as an ATM device, will now be described. It will be understood that in FIG. 1, four ports 102a–102d are indicated as interfacing to a data receiving device 112. However, any number of ports may be interfaced to any data receiving device according to the present invention. As also shown in FIG. 1, the FIFO memory device 120 is preferably implemented as a single integrated circuit. However, multiple integrated circuits also may be used. Moreover, as shown in FIG. 1, the FIFO memory device 120 includes various blocks that may be embodied in an entirely hardware embodiment. However, it will also be understood that the FIFO memory device 120 may also be embodied as an entirely software embodiment or an embodiment combining software and hardware elements. When combining software and hardware elements, one or more of the blocks in FIG. 1 may be embodied by a stored program that executes on a processor in the FIFO memory device 120.

Referring again to FIG. 1, the plurality of ports 102a–102d are identified by LINE0–LINE3, each of which transmits data to the data receiving device 112. The data that is transmitted from the ports 102a–102d and that is received by the FIFO memory device 120 is indicated by RxDATA0–RxDATA3. The FIFO memory device 120 includes a corresponding plurality of FIFO memory blocks 104a–104d, also labeled FIFO0–FIFO3. The FIFO memory blocks may be single port or multiport FIFO memory blocks. As shown in FIG. 1, each FIFO memory block may be divided into a plurality of cells, for example cells C1–C3. The received data RxDATA0–RxDATA3 is written into the corresponding FIFO0–FIFO3. Output data D0–D3 is read from the corresponding FIFO memory block FIFO0–FIF03. Each of the FIFOs 104a–104d also includes a flag that indicates whether the FIFO is empty. These flags are labeled RxFIFOEMPTY0–RxFIFOEMPTY3. The design and operation of FIFO memory blocks 104a–104d are well known to those having skill in the art, and need not be described further herein.

FIG. 1 also illustrates a data receiving device 112 that provides a plurality of enable signals that can enable one or more of the ports corresponding to a FIFO 104a–104d at a given time. As shown in FIG. 1, separate receive enable lines $\overline{\text{RxEN}} <0-3>$ provide indications to enable one or more of the ports 102a–102d. However, these indications maybe multiplexed on a single serial line, on parallel lines or may otherwise be provided using techniques well known to those having skill in the art. The indications $\overline{\text{RxEN} <0-3>}$ provide an indication from the data receiving device that the data receiving device is enabled to receive data from one or more of the FIFO memory blocks 104a–104d. A plurality of indications RxCLAV<0–3> are also provided to the data receiving device from the FIFO memory device 120. These indications are the inverse of the flags that indicate whether the FIFO is empty. In other words RxCLAV= RxFIFOEMPTY.

When the data receiving device 112 enables only a single port corresponding to a single FIFO memory block, data from the associated FIFO memory block may be transmitted to the data receiving device. However, when the data receiving device provides an indication that the data receiving device is enabled to receive data from at least two of the FIFO memory blocks, arbitration should be used to identify which of the at least two FIFO memory blocks will actually transmit data to the data receiving device. According to the present invention, priority encoding 100 is used to transmit data D0–D3 to the data receiving device 112 from a highest priority FIFO memory block 104a–104d that is selected from at least two of the FIFO memory blocks 104a–104d until the highest priority FIFO memory block is empty. Transfer of data is inhibited to the data receiving device 112 from the remaining ones of the FIFO memory blocks 104a–104d until the highest priority FIFO memory block is empty. Data transfer and inhibition of data transfer takes place in response to an indication $\overline{\text{RxEN}}$ <0–3> from the data receiving device 112 that the data receiving device is enabled to receive data from at least two of the FIFO memory blocks.

In a preferred embodiment of priority encoding 100 according to the present invention, a receive (Rx) priority encoder 110 identifies the highest priority FIFO memory block from the at least two of the FIFO memory blocks in response to the indication $\overline{\text{RxEN}}$ <0–3> from the data receiving device 112 that the data receiving device is enabled to receive data from at least two of the FIFO memory blocks. The priority encoder 110 produces an identification of the highest priority FIFO memory block from the at least two of the FIFO memory blocks. This identification is indicated by the signals $\overline{\text{RxEN\_PRIORITY}}$ <0–3> in FIG. 1. Stated differently, in response to multiple enabled ports that are provided by the data receiving device 112 to the priority encoder 110, only a single port will be indicated by the priority encoder 110 as having priority.

Still referring to FIG. 1, a logic block 106, labeled in FIG. 1 as Rx PORT CHOICE LOGIC, produces a FIFO selection signal SEL_PORT<0–3> for the identified highest priority memory block. The logic signal SEL_PORT<0–3> remains active until the identified highest priority FIFO block is empty. Accordingly, the Rx PORT CHOICE LOGIC 106 is responsive to the priority encoder 110 and responsive to the RxFIFOEMPTY<0–3> signal, to provide a selection signal for one of the FIFOs 104a–104d that remains active as long as there is data in the FIFO.

Finally, referring to FIG. 1, a multiplexer (MUX) 108 is responsive to the FIFO selection signal SEL_PORT<0–3>, to transmit data D0–D3 from the identified highest priority FIFO memory block 104a–104d to the data receiving device 112 in response to the selection signal. The data transmitted by multiplexer 108 to the data receiving device is labeled RxDATA in FIG. 1.

Figure 2:
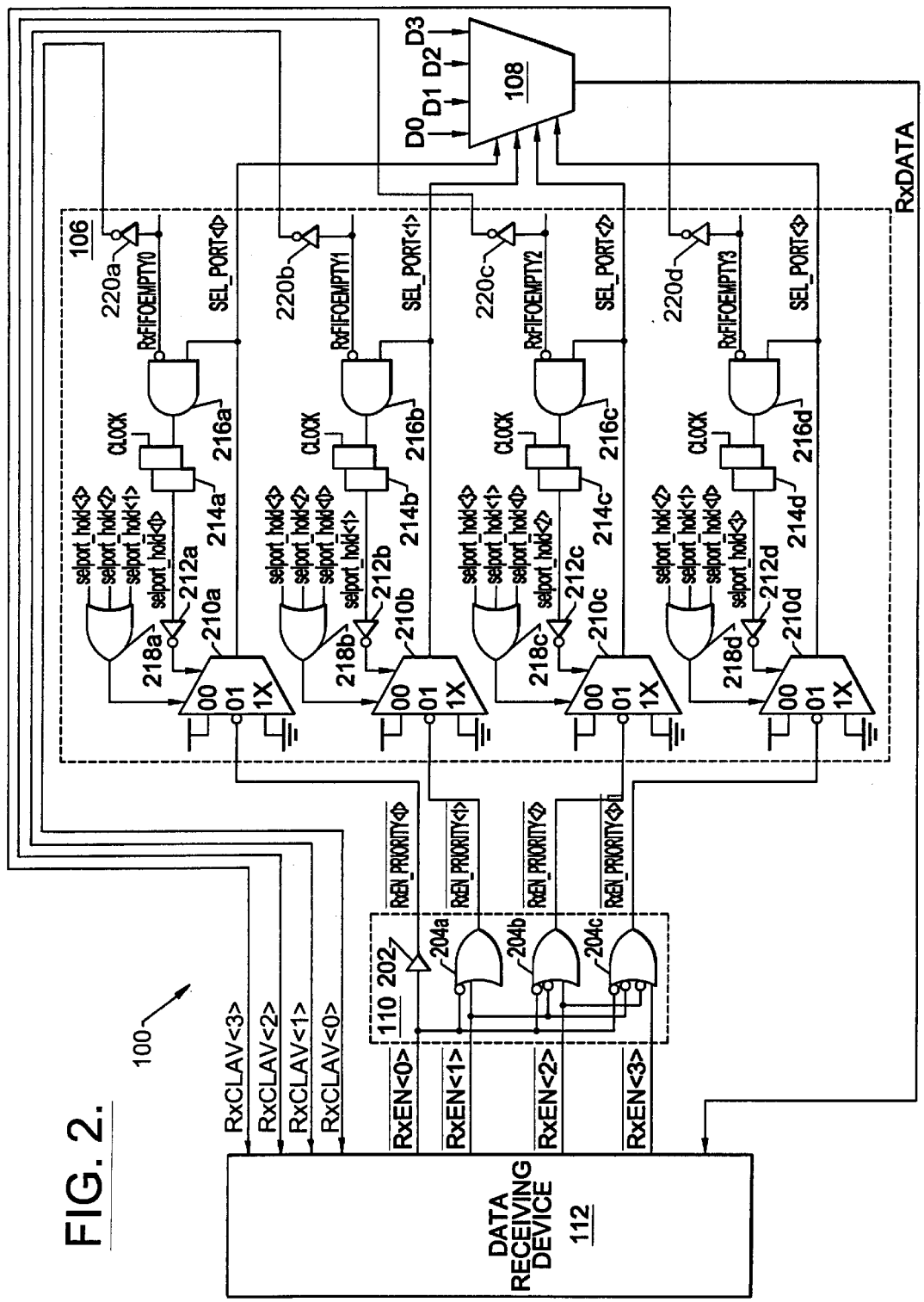
FIG. 2 is a logic diagram of a priority encoder and port choice logic of FIG. 1.

Referring now to FIG. 2, a logic diagram of priority encoding 100 of FIG. 1 will now be described. It will be understood that the logic diagram of FIG. 2 is an implementation using AND-OR-INVERT (AOI) logic. However, many other logic implementations may be provided, as well as implementations that use other hardware and/or software elements.

Referring now to FIG. 2, the priority encoder 110 includes a buffer 202 and three OR gates 204a–204c. The buffer 202 and the three OR gates 204a–204c provide combinatorial logic that causes the highest priority port selected from the ports that are enabled by the data receiving device 112, to be enabled. Each of the FIFO memory blocks 104a–104d is assigned a predetermined priority number. Thus, as shown in FIG. 2, LINE0 has the highest priority number, and the priority number decreases through LINE3 which has the lowest priority number. The combinatorial circuit for the priority encoder 110 of FIG. 2 combines the priority number and the ports that are enabled by the data receiving device to enable one priority signal $\overline{\text{RxEN\_PRIORITY}}$ <0–3> for the highest priority FIFO memory block. For example, if the data receiving device 112 enables ports 1, 2 and 3 by activating $\overline{\text{RxEN}}$ <1>, $\overline{\text{RxEN}}$ <2> and $\overline{\text{RxEN}}$ <3>, the priority encoder 110 will provide an enable signal for port 1 by activating $\overline{\text{RxEN\_PRIORITY}}$ <1>.

Still referring to FIG. 2, the Rx PORT CHOICE LOGIC 106 produces a FIFO selection signal SEL_PORT <0–3> for the identified highest priority FIFO memory block $\overline{\text{RxEN\_PRIORITY}}$ <0–3> that remains active until the identified highest priority FIFO block is empty, in response to the priority encoder 110 and to the indication RxFIFOEMPTY<0–3> that the FIFO blocks are empty. Thus, in the example given above, SEL_PORT<1> will remain active until RxFIFOEMPTY<1> becomes active.

In particular, the Rx PORT CHOICE LOGIC 106 includes a multiplexer 210a–210d, an inverter 212a–212d, a flip-flop 214a–214d, an AND gate 216a–216d, and an OR gate 218a–218d for each of the ports. Each multiplexer 210a–210d includes its 00 input tied to VCC, its 10 and 11 inputs tied to GND and its 01 input coupled to the priority encoder 110.

Two selection signals are provided to each multiplexer 210a–210d. The first selection signal is provided by the output of the OR gate 218a–218d and the second selection signal is provided by the output of the inverter 212a–212d. The AND gate 216a–216d is responsive to the output of the multiplexer 210a–210d and to the FIFO empty indication RxFIFOEMPTY<0–3>. As long as the particular FIFO is selected as having a highest priority and the FIFO is not empty, the corresponding flip-flop 214a–214d will maintain a signal shown in FIG. 2 as selport_hold<0–3>, so that the output of the multiplexer does not change. The OR gate 218a–218d is tied to the remaining three selport_hold signals, to prevent the multiplexer from sending an active SEL_PORT signal when one of the other three FIFOs is active.

Thus, only one of the signals SEL_PORT<0–3> that emerge from the Rx PORT CHOICE LOGIC 106 is active at any time. This active signal controls the multiplexer 108, to transmit only one of the output data strings D0–D3 from a FIFO 104a–104d to the data receiving device 112. Accordingly, the active SEL_PORT signal from the Rx PORT CHOICE LOGIC 106 controls the RxDATA bus until its corresponding FIFO is empty. Once empty, the next highest priority FIFO that is not empty is given control of the RxDATA bus. The indications RxFIFOEMPTY<0–3> are inverted by inverters 220a–220d to produce the signals RxCLAV<0–3> that are input to the data receiving device 112.

Figure 3:
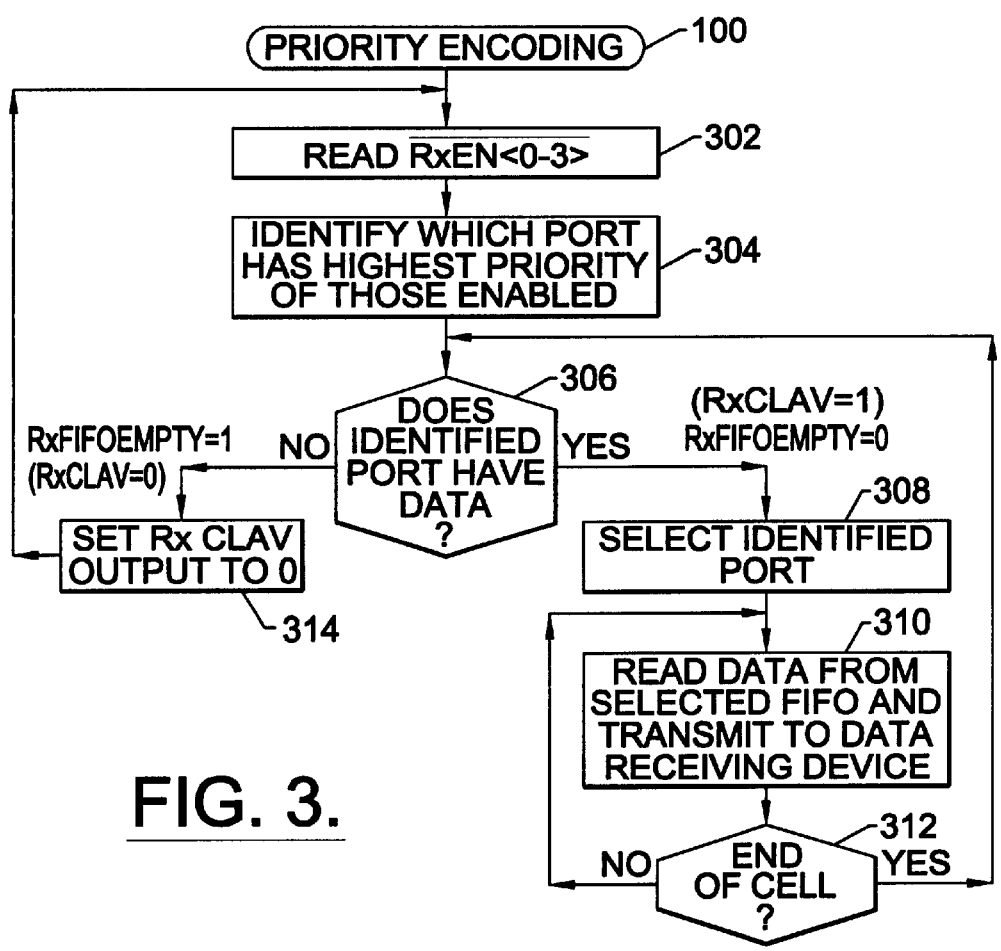
FIG. 3 is a flowchart of operations performed in priority encoding according to the present invention.

Referring now to FIG. 3, operations for priority encoding according to the present invention will now be described. It will be understood that these operations may be implemented by the logic circuit of FIG. 2, and also may be implemented by other logic circuits and/or stored programs.

Referring now to FIG. 3, at Block 302, all of the indications from the data receiving device 112 that the data receiving device is enabled to receive data from at least two of the FIFO memory blocks are received. These indications are labeled $\overline{\text{RxEN}}$ <0–3> in FIGS. 1 and 2.

At Block 304, an identification is made, for example by priority encoder 110, to identify which port has the highest priority of those ports that are enabled. The identification is provided by activating one of the signals RxEN_PRIORITY <0–3> in FIGS. 1 and 2. A test is then made at Block 306 as to whether the identified port has data. This test is made, for example by the Rx PORT CHOICE LOGIC 106 of FIGS. 1 or 2 with reference to the RxFIFOEMPTY indicators. If the identified port has data, as indicated by the RxFIFOEMPTY indicator being logic 0, then the identified port is selected at Block 308 and data is read from the selected FIFO and transmitted to the data receiving device at Block 310, until the end of a FIFO cell C1–C3 is reached at Block 312.

When the end of the cell is reached, the test of Block 306 is again made to determine whether the identified port has data. If the identified port has data, the next cell is read until the end of the cell, by again performing the operations of Blocks 308, 310 and 312. If there is no data in the identified port, then at Block 314, the RxCLAV output for the identified port is set to logic 0 by the associated RxFIFOEMPTY being set to logic 1, indicating that all of the data has been transmitted by this port.

Accordingly, in the receive mode, control of the receive bus is arbitrated among the four ports to prevent bus contention. The ports are arbitrated on a priority basis. Control of the receive bus is given to the port with the highest priority, with priority 0 being highest, and control of the receive bus is maintained until the FIFO of that port is empty. Control is then given to the next highest priority port that has received data.

Because of the differing rates at which data is provided to the ATM and received by the ports, typically all ports will have an opportunity to provide all of their data before the highest priority port will fill its FIFO and request the receive bus again. Thus, the arbitration may always give the bus to the highest priority port without a high likelihood of the highest priority port dominating the available bandwidth of the ATM receive bus. Moreover, by allowing a FIFO to empty before transferring control to another port, efficient transfer of data may be obtained compared to techniques which interrupt transfer of data from a FIFO upon enablement of a higher priority FIFO, or which interrupt data transfer from the FIFO at the end of a cell upon enablement of a higher priority FIFO.

Various aspects of the present invention were illustrated in detail in the figures, including flowchart illustrations. It will be understood that individual blocks of the figures, and combinations of blocks in the figures, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the block or blocks.

Accordingly, blocks of the figures support combinations of means for performing the specified functions, combinations of steps for performing the specified functions and program instruction means for performing the specified functions. It will also be understood that individual blocks of the figures, and combinations of blocks in the flowchart illustrations, can be implemented by special purpose hardware-based computer systems which perform the specified functions or steps, or by combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A first-in-first-out (FIFO) memory device that interfaces a plurality of ports to a data receiving device, the FIFO memory device comprising:
    a plurality of FIFO memory blocks, a respective one of which receives data from a respective one of the ports; and
    a priority encoding system that transmits data to the data receiving device from a highest priority FIFO memory block that is selected from at least two of the FIFO memory blocks until the highest priority FIFO memory block is empty, and that inhibits transfer of data to the data receiving device from remaining ones of the FIFO memory blocks until the highest priority FIFO memory block is empty, in response to an indication from the data receiving device that the data receiving device is enabled to receive data from the at least two of the FIFO memory blocks.

2. A device according to claim 1 wherein each of the FIFO memory blocks provides an indication that the FIFO block is empty, the priority encoding system comprising:
    a priority encoder that identifies the highest priority FIFO memory block from the at least two of the FIFO memory blocks in response to the indication from the data receiving device that the data receiving device is enabled to receive data from at least two of the FIFO memory blocks;
    a logic circuit that produces a FIFO selection signal for the identified highest priority FIFO memory block that remains active until the identified highest priority FIFO block is empty in response to the priority encoder and to the indications that the FIFO blocks are empty; and
    a multiplexer that transmits data to the data receiving device from the identified highest priority FIFO memory block in response to the FIFO selection signal.

3. A device according to claim 2 wherein each of the FIFO memory blocks is assigned a predetermined priority number, from a lowest priority number to a highest priority number, and wherein the priority encoder selects the FIFO memory block having the highest priority number from the at least two of the FIFO memory blocks that are enabled by the data receiving device.

4. A device according to claim 2 wherein the logic circuit produces the FIFO selection signal for the highest priority FIFO memory block until the highest priority FIFO block is empty, notwithstanding that the data receiving device ceases to produce the indication that the data receiving device is enabled to receive data from the at least two of the FIFO memory blocks.

5. A device according to claim 1 wherein each of the FIFO memory blocks comprises a plurality of cells, the priority encoding system being responsive to the indication from the data receiving device that the data receiving device is enabled to receive data from at least two of the FIFO memory blocks, to transmit data to the data receiving device from all of the cells in the highest priority FIFO memory block that is selected from the at least two of the FIFO memory blocks until all of the cells in the highest priority FIFO memory block are empty and to inhibit transfer of data to the data receiving device from remaining ones of the FIFO memory blocks until all of the cells in the highest priority FIFO memory block are empty.

6. A device according to claim I wherein each of the ports is a serial port and wherein the data receiving device is an Asynchronous Transfer Mode (ATM) device.

7. A device according to claim 1 wherein the plurality of ports transmit data to the data receiving device under a Universal Test and Operation Physical Interface for Asynchronous transfer mode (UTOPIA) 1 specification.

8. A first-in-first-out (FIFO) memory device that interfaces a plurality of ports to a data receiving device, the FIFO memory device comprising:

a plurality of FIFO memory blocks, a respective one of which receives data from a respective one of the ports; and means for transmitting data to the data receiving device from a highest priority FIFO memory block that is selected from at least two of the FIFO memory blocks until the highest priority FIFO memory block is empty, and for inhibiting transfer of data to the data receiving device from remaining ones of the FIFO memory blocks until the highest priority FIFO memory block is empty, in response to an indication from the data receiving device that the data receiving device is enabled to receive data from the at least two of the FIFO memory blocks.

9. A device according to claim 8 wherein each of the FIFO memory blocks provides an indication that the FIFO block is empty, the means for transmitting comprising:

means for identifying the highest priority FIFO memory block from the at least two of the FIFO memory blocks in response to the indication from the data receiving device that the data receiving device is enabled to receive data from at least two of the FIFO memory blocks;

means for producing a FIFO selection signal for the identified highest priority FIFO memory block that remains active until the identified highest priority FIFO block is empty in response to the priority encoder and to the indications that the FIFO blocks are empty; and means for transmitting data to the data receiving device from the identified highest priority FIFO memory block in response to the FIFO selection signal.

10. A device according to claim 9 wherein each of the FIFO memory blocks is assigned a predetermined priority number, from a lowest priority number to a highest priority number, and wherein the means for identifying comprises means for selecting the FIFO memory block having the highest priority number from the at least two of the FIFO memory blocks that are enabled by the data receiving device.

11. A device according to claim 9 wherein the means for producing comprises means for producing the FIFO selection signal for the highest priority FIFO memory block until the highest priority FIFO block is empty, notwithstanding that the data receiving device ceases to produce the indication that the data receiving device is enabled to receive data from the at least two of the FIFO memory blocks.

12. A device according to claim 8 wherein each of the FIFO memory blocks comprises a plurality of cells, the means for transmitting being responsive to the indication from the data receiving device that the data receiving device is enabled to receive data from at least two of the FIFO memory blocks, for transmitting data to the data receiving device from all of the cells in the highest priority FIFO memory block that is selected from the at least two of the FIFO memory blocks until all of the cells in the highest priority FIFO memory block are empty and for inhibiting transfer of data to the data receiving device from remaining ones of the FIFO memory blocks until all of the cells in the highest priority FIFO memory block are empty.

13. A device according to claim 8 wherein each of the ports is a serial port and wherein the data receiving device is an Asynchronous Transfer Mode (ATM) device.

14. A device according to claim 8 wherein the plurality of ports transmit data to the data receiving device under a Universal Test and Operation Physical Interface for Asynchronous transfer mode (UTOPIA) 1 specification.

15. A method for interfacing a plurality of ports to a data receiving device, using a plurality of first-in-first-out (FIFO) memory blocks, a respective one of which receives data from a respective one of the ports, the method comprising the step of:

transmitting data to the data receiving device from a highest priority FIFO memory block that is selected from at least two of the FIFO memory blocks until the highest priority FIFO memory block is empty, and inhibiting transfer of data to the data receiving device from remaining ones of the FIFO memory blocks until the highest priority FIFO memory block is empty, in response to an indication from the data receiving device that the data receiving device is enabled to receive data from the at least two of the FIFO memory blocks.

16. A method according to claim 15 wherein each of the FIFO memory blocks provides an indication that the FIFO block is empty, the transmitting step comprising the steps of:

identifying the highest priority FIFO memory block from the at least two of the FIFO memory blocks in response to the indication from the data receiving device that the data receiving device is enabled to receive data from at least two of the FIFO memory blocks;

producing a FIFO selection signal for the identified highest priority FIFO memory block that remains active until the identified highest priority FIFO block is empty in response to the priority encoder and to the indications that the FIFO blocks are empty; and transmitting data to the data receiving device from the identified highest priority FIFO memory block in response to the FIFO selection signal.

17. A method according to claim 16 wherein each of the FIFO memory blocks is assigned a predetermined priority number, from a lowest priority number to a highest priority number, and wherein the step of identifying comprises the step of selecting the FIFO memory block having the highest priority number from the at least two of the FIFO memory blocks that are enabled by the data receiving device.

18. A method according to claim 16 wherein the step of producing comprises the step of producing the FIFO selection signal for the highest priority FIFO memory block until the highest priority FIFO block is empty, notwithstanding that the data receiving device ceases to produce the indication that the data receiving device is enabled to receive data from the at least two of the FIFO memory blocks.

19. A method according to claim 15 wherein each of the FIFO memory blocks comprises a plurality of cells, the step of transmitting being responsive to the indication from the data receiving device that the data receiving device is enabled to receive data from at least two of the FIFO memory blocks, for transmitting data to the data receiving device from all of the cells in the highest priority FIFO memory block that is selected from the at least two of the FIFO memory blocks until all of the cells in the highest priority FIFO memory block are empty and for inhibiting transfer of data to the data receiving device from remaining ones of the FIFO memory blocks until all of the cells in the highest priority FIFO memory block are empty.

20. A computer program product that interfaces a plurality of ports to a data receiving device, using a plurality of first-in-first-out (FIFO) memory blocks, a respective one of which receives data from a respective one of the ports, the computer program product comprising a computer-readable storage medium having computer-readable program code means embodied in the medium, the computer-readable program code means comprising:

computer-readable program code means for transmitting data to the data receiving device from a highest priority FIFO memory block that is selected from at least two of the FIFO memory blocks until the highest priority FIFO memory block is empty, in response to an indication from the data receiving device that the data receiving device is enabled to receive data from the at least two of the FIFO memory blocks; and computer-readable program code means for inhibiting transfer of data to the data receiving device from remaining ones of the FIFO memory blocks until the highest priority FIFO memory block is empty, in response to the indication from the data receiving device that the data receiving device is enabled to receive data from the at least two of the FIFO memory blocks.

* * * * *

UNITED STATES PATENT AND TRADEMARK OFFICE
CERTIFICATE OF CORRECTION

PATENT NO. : 6,266,748 B1  
DATED : July 24, 2001  
INVENTOR(S) : Robert H. Bishop Page 1 of 1

It is certified that error appears in the above-identified patent and that said Letters Patent is hereby corrected as shown below:

<u>Title page,</u>  
Item [56], References Cited, OTHER DOCUMENTS,

-- U.S. Application No. 08/664,873, Chan et al., Filed June 17, 1996

"PHY (TC-PMD) for 25.6 and 51.2 Mbps ATM Networks", IDT77105, Integrated Device Technology, Inc., December 1998, pp. 1-26

"Quad UTOPIA-1 PHY (TC-PMD) for 25.6 Mbps ATM Networks", Advanced IDT771254, Integrated Device Technology, Inc., December 1996, p. 1

"UtopiaFIFO™ 4-Port (128 x 9 x 4) Multiplexer-FIFO", Advance Information IDT77305, Integrated Device Technology, Inc., January 1996, pp. 1-14 --

Signed and Sealed this

Fifth Day of March, 2002

*Attest:*

*Attesting Officer*

JAMES E. ROGAN  
*Director of the United States Patent and Trademark Office*